(12) United States Patent
    Vucurevich

(10) Patent No.: US 8,965,271 B1
(45) Date of Patent: Feb. 24, 2015

(54) METHOD AND MECHANISM FOR COORDINATED CAPTURE AND ORGANIZATION OF MULTIMEDIA DATA

(75) Inventor: Ted Vucurevich, Los Gatos, CA (US)

(73) Assignee: Enconcert, Inc., Los Gatos, CA (US)

( * ) Notice: Subject to any disclaimer, the term of this patent is extended or adjusted under 35 U.S.C. 154(b) by 537 days.

(21) Appl. No.: 13/102,794

(22) Filed: May 6, 2011

Related U.S. Application Data

(60) Provisional application No. 61/332,522, filed on May 7, 2010, provisional application No. 61/332,490, filed on May 7, 2010.

(51) Int. Cl.
    *H04H 40/00* (2008.01)
    *H04N 7/18* (2006.01)

(52) U.S. Cl.
    USPC .......................................... 455/3.06

(58) Field of Classification Search
    CPC ..... H04H 40/00; H04N 7/18; H04M 3/42161; H04W 16/14; H04W 4/06; H04W 4/206; H04W 8/18
    USPC .......................................... 455/3.06
    See application file for complete search history.

(56) References Cited

U.S. PATENT DOCUMENTS

| | | | |
|---|---|---|---|
| 7,542,073 B2 | 6/2009 | Li et al. | |
| 7,835,785 B2 | 11/2010 | Scully et al. | |
| 8,001,472 B2 | 8/2011 | Gilley et al. | |
| 8,135,413 B2 | 3/2012 | Dupray | |
| 8,135,635 B2 * | 3/2012 | Molotsi et al. | 705/32 |
| 8,432,489 B2 * | 4/2013 | Arseneau et al. | 348/461 |
| 8,499,038 B1 * | 7/2013 | Vucurevich | 709/204 |
| 8,565,735 B2 * | 10/2013 | Wohlwend et al. | 455/414.1 |
| 2002/0080721 A1 | 6/2002 | Tobagi et al. | |
| 2006/0031126 A1 | 2/2006 | Ma et al. | |
| 2007/0211678 A1 | 9/2007 | Li et al. | |
| 2007/0299976 A1 * | 12/2007 | Zafar et al. | 709/229 |
| 2008/0189371 A1 * | 8/2008 | Shaffer et al. | 709/206 |
| 2009/0063419 A1 * | 3/2009 | Nurminen et al. | 707/3 |
| 2009/0237505 A1 * | 9/2009 | Ortiz et al. | 348/143 |
| 2010/0157972 A1 | 6/2010 | Junell | |
| 2011/0071792 A1 * | 3/2011 | Miner | 702/182 |
| 2011/0075612 A1 | 3/2011 | Guo et al. | |
| 2012/0136967 A1 | 5/2012 | Ito et al. | |
| 2012/0224024 A1 * | 9/2012 | Lueth et al. | 348/43 |
| 2013/0117365 A1 * | 5/2013 | Padmanabhan et al. | 709/204 |

OTHER PUBLICATIONS

Notice of Allowance and Fes Due dated Mar. 19, 2013 for U.S. Appl. No. 13/102,806.
Non-final Office Action dated Apr. 12, 2013, for U.S. Appl. No. 13/524,365.
Non-final Office Action dated Oct. 18, 2012, for U.S. Appl. No. 13/102,806.
D.L. Mills, "Network Time Protocol (NTP)", M/A-COM Linkabit, Network Working Group, RFC 958, Sep. 1985, 14 pages.

(Continued)

*Primary Examiner* — Bobbak Safaipour
(74) *Attorney, Agent, or Firm* — Vista IP Law Group, LLP

(57) ABSTRACT

Disclosed is an improved approach for capturing multimedia information in a coherent manner to inherently permit aggregation or synchronization with other coherently captured multimedia information. Also disclosed are techniques for using a rich semantic model for relating and aggregating the captured data.

21 Claims, 7 Drawing Sheets

(56) References Cited

OTHER PUBLICATIONS

David W. Allan et al., "The Science of Timekeeping, Application Note 1289" Hewlett-Packard Company, Jun. 1997, 87 pages.
Mark Martinec, "Time with Focus on NTP and Slovenia" Mar. 21, 2000, 35 pages.
D.L. Mills, "Internet Time Synchronization", IEEE Transactions on Communication, vol. 39, Issue 10, Oct. 1991, 12 pages.
David L. Mills, "Modelling and Analysis of Computer Network Clocks", University of Delaware, Electrical Engineering Department, Technical Report 92-5-2, May 1992, 31 pages.
U.S. Appl. No. 13/102,806, filed May 6, 2011, Entitled "Method and Mechanism for Performing Cloud Image Display and Capture with Mobile Devices", 47 pages.
Advisory Action dated Jan. 17, 2014 for U.S. Appl. No. 13/524,365.
Non-final Office Action dated Jun. 5, 2014 for U.S. Appl. No. 13/954,583.
Final Office Action dated Sep. 30, 2013 for U.S. Appl. No. 13/524,365.
Non-final Office Action dated Oct. 2, 2014 for U.S. Appl. No. 13/524,365.
Final Office Action dated Nov. 19, 2014, for U.S. Appl. No. 13/954,583.

* cited by examiner

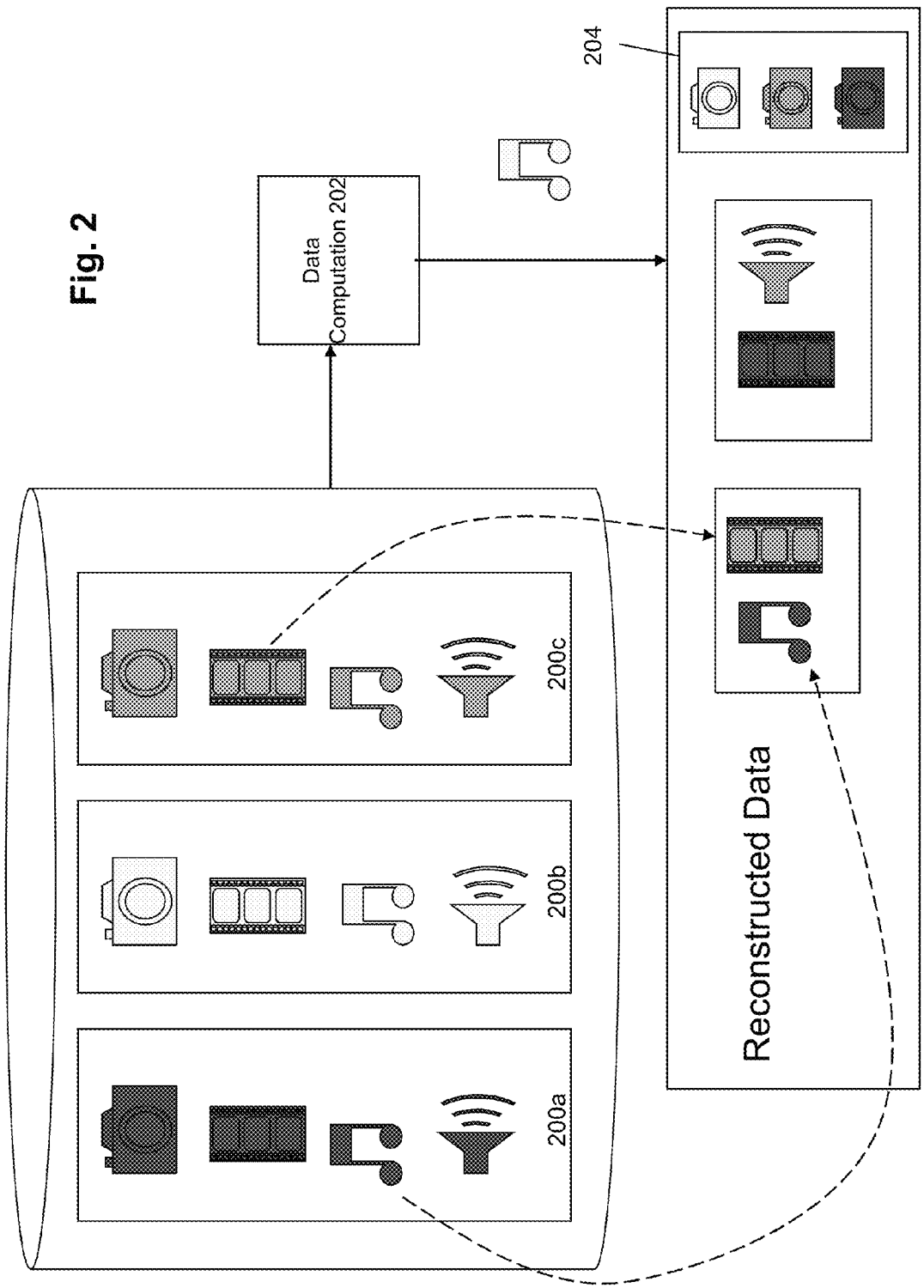

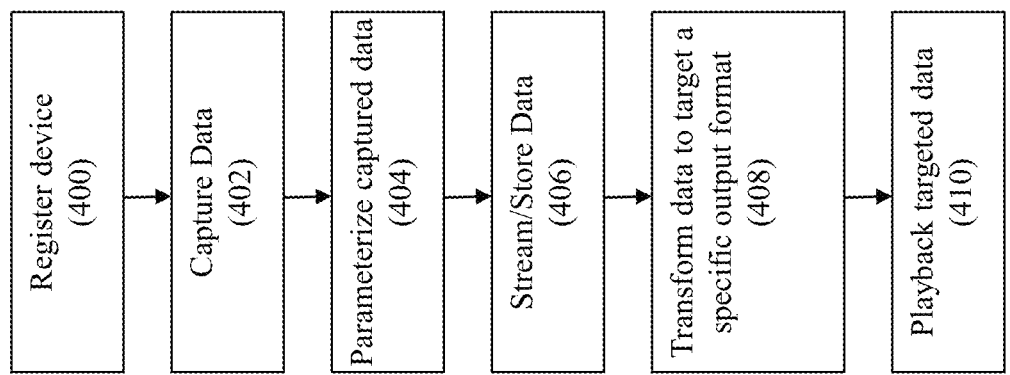

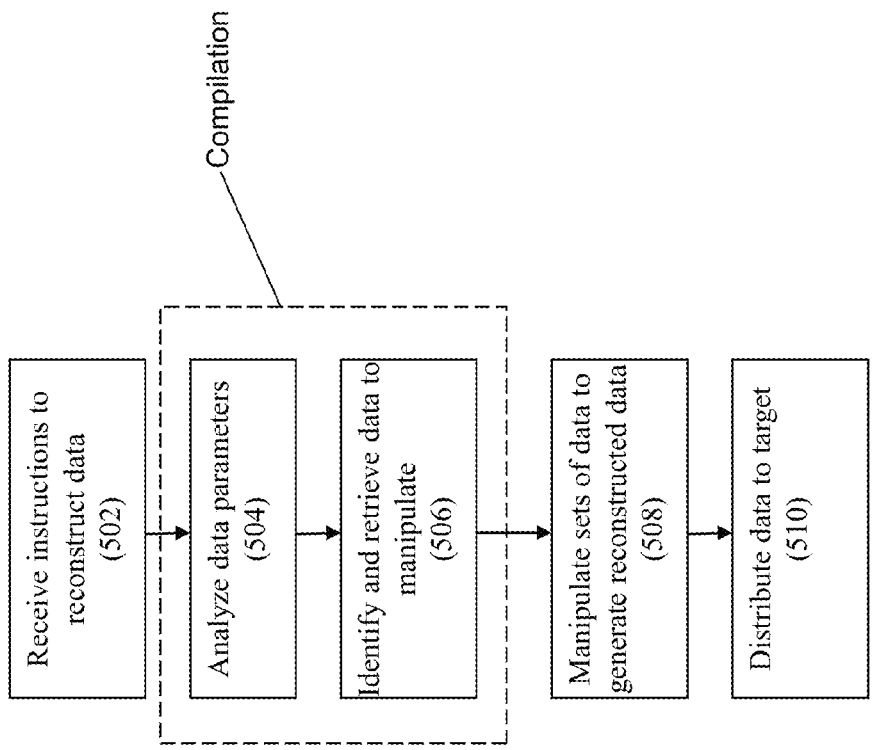

METHOD AND MECHANISM FOR COORDINATED CAPTURE AND ORGANIZATION OF MULTIMEDIA DATA

CROSS REFERENCE TO RELATED APPLICATIONS

The present application claims the benefit of U.S. Provisional Application 61/332,522 and U.S. Provisional Application 61/332,490, both filed on May 7, 2010, which are hereby incorporated by reference in their entirety. The present application is related to co-pending U.S. application Ser. No. 13/102,806, titled "METHOD AND MECHANISM FOR PERFORMING CLOUD IMAGE DISPLAY AND CAPTURE WITH MOBILE DEVICES", which was filed on even date herewith and which is hereby incorporated by reference in its entirety.

FIELD OF THE INVENTION

The present invention relates generally to the field of ad hoc multimedia data capture and processing.

BACKGROUND OF THE INVENTION

Many types of events are held everyday which generate or are capable of generating different types of multimedia data. For example, consider the typical sporting event or music concert. Such events may be the subject of live broadcasting, filming, or streaming over the internet. The video of the event may be recorded from multiple camera angles, and focused at many different subjects from different parts of the music stage or sports field. In addition, for the concert example, sound recordings may be taken from many different locations, performers, or instruments. Still photographs are yet another type of media which may be captured for the event from many locations to obtain photographs of many different scenes at the event.

As is evident, any event may be associated with multiple sources of data that are created or recorded for that event. The data may be of different types and formats, e.g., sound, video, photographs, etc.

While these many devices are capturing data relating to the exact same event, conventionally these capture devices are completely independent from one another. The conventional media that is used to capture these events, e.g., film, MPEG4, MPEG3, etc, inherently includes only information specific to each individual recording device and medium. Therefore, while the MPEG4 video recording may provide an accurate video of what is being recorded from a very specific camera angle at a very specific recording subject, there is no inherent way to correlate or relate that recording with any other video recording of the exact same event that may have occurred from another camera angle, with an audio or still photo recording of the same subject, or recordings in multiple media which are being directed at another recording subject.

Existing solutions to this problem are highly manual in nature, high in cost, and are generally imprecise. For example, the broadcast of a sporting event may involve the strategic positioning of video cameras at different locations within the sporting arena. A production crew is charged with the task of knowing the locations of these cameras and the subjects that are being recorded with these cameras. During either a live broadcast or later production of an aggregated film clip, the production/editing crew must manually review the video recordings to determine the exact subject being recorded, and must essentially estimate or re-generate the relations between the different recordings. Therefore, any attempt to integrate the data from the multiple sources is essentially done in an ad hoc manner using highly manual techniques that generally "guess" at the recording parameters of each recording.

This problem is further complicated by the modern trend of having audience members bring portable electronic devices that are capable of capturing and recording the live event. For example, audience members may bring mobile phones that have image, video, or sound capture capability, and use those mobile devices to capture data relating to the event. Those mobile devices may be recording videos, images, or sound at different angles and at different subjects at the event. However, even though these portable recording devices are not "officially" recording the event on behalf of the event promoters, those recording may still be of great interest to those that wish to provide a live broadcast or later production of a film for the event. This is because the mobile devices may be capturing videos or photographs that were not captured by the "official" recording devices, and which would be useful or desirable to include in the live broadcast or later production. For example, the mobile device may have captured the scene of a disputed referee call at a sporting event from a very useful angle, or captured the recording of a musical performance from a very unique angle or recording posture.

Conventionally, these mobile devices are completely independent from the control or even access by the production crew for the event. Therefore, there are no known existing approaches that would allow any type of automated approach to integrate recordings from these mobile devices with the "official" recordings of the event. Even if the production/editing crew for the event has access to the recording from the mobile devices, the same issues mentioned before would arise with regard to the lack of a mechanism to easily and efficiently relate the different recordings together in a consistent manner, e.g., with regard to temporal and spatial positioning.

SUMMARY

The present invention provides an improved approach for capturing multimedia information in a coherent manner to inherently permit aggregation or synchronization with other coherently captured multimedia information. Embodiments of the invention also provide a rich semantic model for relating and aggregating the captured data.

Other objects, features, and advantages of the invention are described in the detailed description, figures, and claims.

BRIEF DESCRIPTION OF THE DRAWINGS

The drawings illustrate the design and utility of embodiments of the present invention, in which similar elements are referred to by common reference numerals. In order to better appreciate the advantages and objects of a preferred embodiment, reference should be made to the accompanying drawings that illustrate this preferred embodiment. However, the drawings depict only one embodiment of the invention, and should not be taken as limiting its scope.

FIG. 2 illustrates example approaches for manipulating captured data.

FIG. 4 shows a flowchart of a process for implementing some embodiments of the invention.

FIG. 5 shows a flowchart of a process for generating data enhancements according to some embodiments of the invention.

DETAILED DESCRIPTION

The present invention provides an improved approach for capturing multimedia information in a coherent manner to inherently permit aggregation or synchronization with other coherently captured multimedia information. The invention also provides a rich semantic model for relating and aggregating the captured data.

According to some embodiments of the invention, data is captured by the different capture devices in a parameterized manner, such that the data itself can inherently provide a consistent relationship relative to other items of data being captured for the same event. For example, some parameters associated with the data may include information to enhance the relationships between data, such as the location, viewing angle, and coordinated capture time for the device and/or data. Capturing the recorded data using such parameters allows the data to be more accurately and efficiently used and integrated. Additional contextual information about the event such as, but not limited to, name of song being played, play number in a sporting event, or act and scene in a play are also captured and related to the physical parameters.

Figure 1:
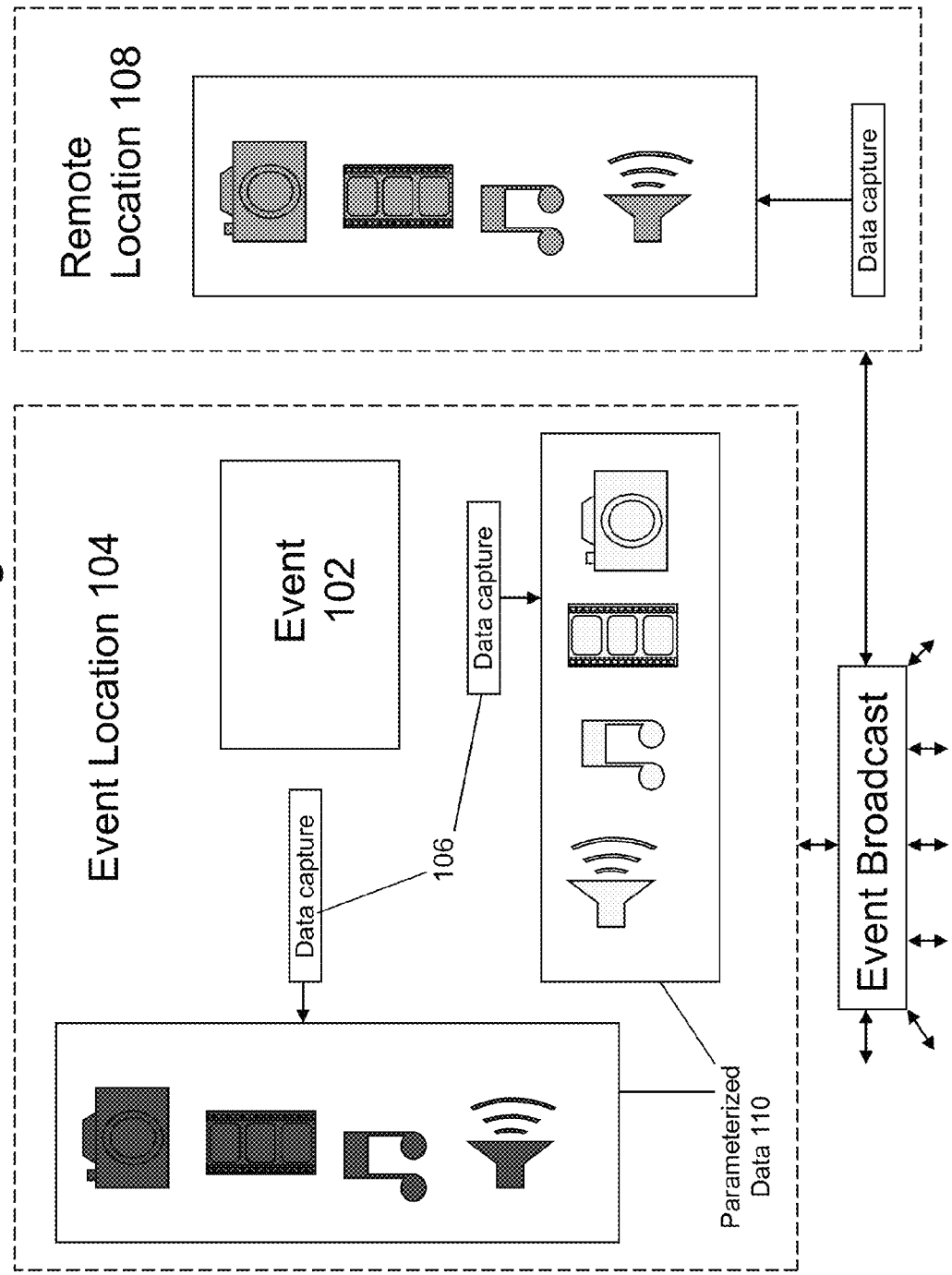
FIG. 1 illustrates an example event and data being captured for the event.

To illustrate, consider the event scenario shown in FIG. 1. This figure illustrates an event 102 that is occurring at a given event location 104. The event 102 may be any type of event that is capable of generating real-time recordable data. For example, the event may be a music concert that is occurring at a theater or other musical venue, or it may be a sporting event that is occurring at a sports arena.

At the event location, there are one or more data capture devices 106 that are capable of capturing one or more types of data or information at the event location. Any type of data capture device 106 may be used to capture any type of data for the event. For example, the data capture devices 106 may be used to capture video, pictures, audio, speech, and text. Such data capture devices may include video cameras, still photography cameras, sound microphones, and sound capture devices for musical instruments.

The data capture devices may be recording devices that have been "officially" placed and positioned in the event location by the sponsors or promoters of the event. Alternatively the data capture devices may be portable recording devices carried into the event location by the audience members, and which are recording the event in an "unofficial" capacity.

The data capture devices may be placed at any location or orientation at the event location. For example, assume that the data capture devices are video cameras. These video cameras may be positioned to view the stage from any location at the event venue, e.g., at fixed location in the venue for the official cameras or at various positions in the seating areas from the perspective of the audience. The video cameras may even be positioned from the perspective of the performers, e.g., by attached video cams to the performers themselves.

The event may be recorded at the event location and broadcast to one or more remote locations 108. An example scenario is that the event is a music concert that is taking place live at a music venue such as a concert hall or music club. The live broadcast of the concert is streamed and broadcast to audiences at a remotely located venue, such as a music club in another city. The remote locations may also be associated with one or more data capture devices.

At both the local and remote locations, data can be captured for the event. At the remote locations, the data being captured could include, for example, video of the audience as they are viewing and participating with the streamed broadcast of the event from the main event location. At the event location, the data being captured may be for any aspect of the event that is occurring live, e.g., the event itself or the surrounding circumstances of the event such as the actions of the audience, real-time comments from the person taking the video, or any other recordable activities or sensations that may be taking place at the event location.

The data is captured and stored in a coherent fashion to allow the data to be easily and efficiently enhanced or interrelated. According to one embodiment, the captured data is stored and maintained as parameterized data 110 that allows for the collected data to be consistently interrelated with each other. Because the data has been captured in a coherent manner, the multiple sets of data can be easily replayed, reconstructed, or organized into an interrelated or aggregated way.

FIG. 2 provides shows an illustration of how the data can be enhanced in this manner. The top portion of the figure shows a set of parameterized data 200a, 200b, and 200c that has been collected for the event. The data could have been collected from any location, including the event location and any remote locations. The data is organized such that they can be coherently related to each other. For example, the video captured from a first capture device 200c at an exact moment in time can be correlated with the audio captured from an entirely different device 200a for that exact same moment in time.

Data computation 202 occurs to manipulate the data in a desired manner. For example, as shown in the bottom of the figure, it may be desired to combine the video captured from a first device with the audio from another device. This is useful, for example, if an audience member has captured a video of a concert from his/her own perspective using a mobile phone, and would like a recording of the concert from that video perspective but with the high quality audio recording from the microphones on the stage. Under this circumstance, the parameterized data would be used to identify the exact set of data that is being considered for aggregation, i.e., video data from a specific individual's mobile device combined with an "official" music track from the concert, mixing the entire ensemble, or emphasizing a particular performer, if so elected by the audience member. The parameterized data would also be used to match up the two sets of data such that they can be correlated for the same time periods and sequences of data capture. Based upon the individual's location, the time periods may need to be shifted to account for image/sound artifact adjustments, e.g., to account for sound delays if the individual was a significant distance away from the music performance. Finally, the appropriately combined data could be packaged up and provided to the individual as his/her "individualized" recording or souvenir of the performance.

Of course, as would be realized by those of ordinary skill in the art, the parameterized data can be manipulated or combined in many useful ways, and is not restricted to this exact example. For example, and as shown in FIG. 2, the still photographs taken by the various different capture devices could be collected and shown as a mosaic 204 of different views of the concert, displayed in real time at the event location and/or made available to participants after the event.

This highlights one of the advantages of the present approach in that inventive parameterization of the data not only allows for very accurate configurations/combinations of the data, but it also allows for very fast and efficient computations to occur for the data. This aspect of the invention is very important, especially if there is a desire or need to perform real-time generation of data for the event.

Figure 3A:
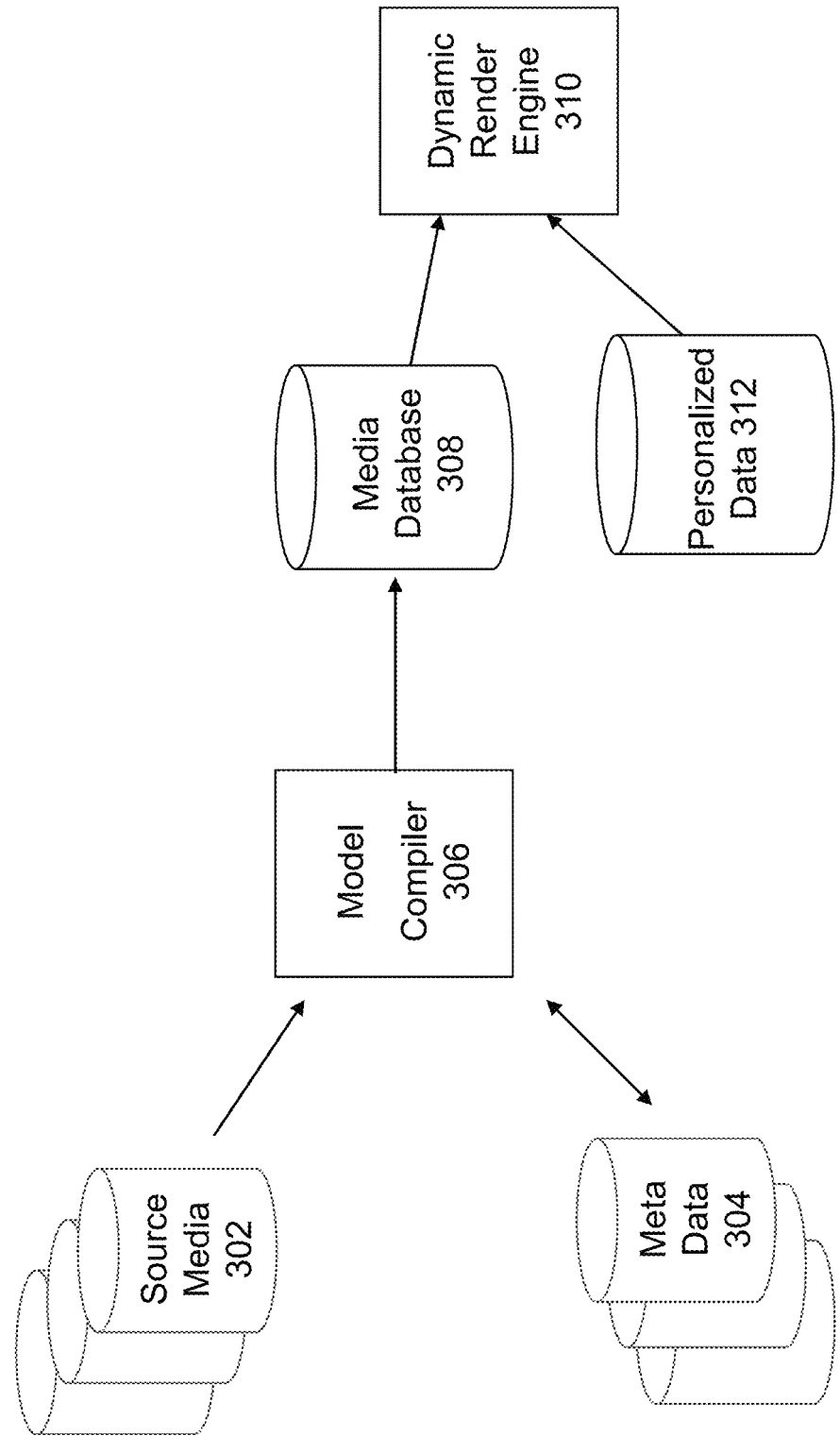
FIG. 3A-B show systems for implementing some embodiments of the invention.

FIG. 3A illustrates a high level architecture of a system for coordinating and managing data for an event according to some embodiments of the invention. The architecture comprises one or more source media 302 that contain media data for the event. The source media 302 may include, for example, the one or more sets of data at an event that is captured and stored for the event. For example, such source media 302 could include the media captured and stored by video cameras or microphones at the event. The architecture may also include metadata 304 that is associated with the source media. The metadata 304 comprises information that establishes coherency of the data relative to other data being recorded for the event. Such data includes, for example, information relating to data and the circumstances surrounding the capture of the data.

A model compiler 306 is employed to integrate the source media 302 and metadata 304 into a media database 308. The media database 308 comprises referential information and structures that retain and enhance relationships between the source media, and preferably is optimized to handle particular types of queries. For example, the model compiler 306 may integrate the source media 302 and the metadata 304 so that media database 308 contains referential structures relating to the spatial and temporal nature and parameters for the source media. In this way, queries can be made based on the spatial or temporal parameters associated with the source media, e.g., to search for media from a given time period or media from a given viewing angle or location.

Unlike the prior art, the media that is produced in the system is not merely composed of static data. Instead, the media data 302 is compiled into the media database 308 in a way that intelligently and comprehensively retains the baseline media data 302, but also allows for the media to be dynamically combined and rendered into new types or sets of media data.

The dynamic render engine 310 is employed to manipulate the data in a desired manner, e.g., to combine media captured from a first device with media from a second device. The metadata 304 that is integrated into the media database 308 by the model compiler 306 forms parameterized data that is used to identify the exact set of data that is needed for manipulation.

The coherent nature of the data in the present embodiment permits accurate queries, since the metadata is configured to be coherent across different capture devices, e.g., where the different capture devices have been coordinated to operate on a common clock. This is unlike searches based merely on prior art timestamps, where timestamps are based on individual device clocks or timestamps for a first device may not accurately have a coherent relationship with the clocks or timestamps for a second device.

Personalized data 312 may also be created and stored for the event. Such personalized data 312 includes, for example, media that is captured from the mobile device being carried by an audience member at the event. The dynamic render engine 310 may be used to combine data from the media database 308 with the personalized data 312 to generate new types or sets of media data. For example, an audience member may have captured a video of a concert from his/her own perspective using a mobile phone, and would like a recording of the concert from that video perspective but with the high quality audio recording from the microphones on the stage. The dynamic render engine 310 matches up the two sets of data such that they can be correlated for the same time periods and sequences of data capture, and appropriately combines the data to produce an individualized recording or souvenir of the performance.

Figure 3B:
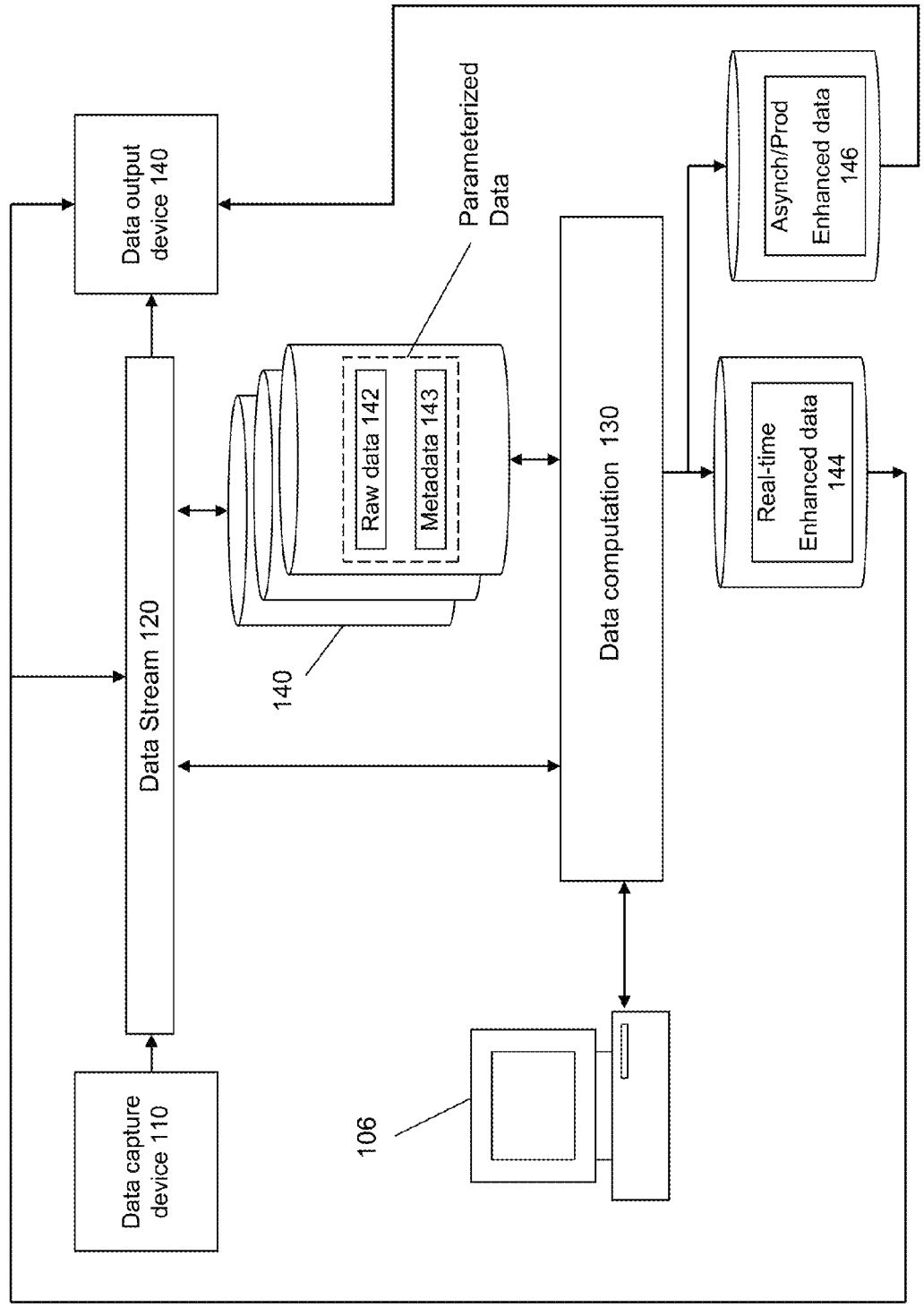

FIG. 3B illustrates a more detailed diagram of a system for coordinating and managing data for an event according to some embodiments of the invention. The system comprises one or more data capture devices 110 which are used to capture data relating to the event. The data capture devices 110 may be any device or mechanism that is suitable for recording multimedia data, such as a video camera, still camera, audio recording device, or a device that integrates some or all of these functions. According to some utilizations of the invention, the data capture devices 110 include at least the capture devices that are provided by the host or sponsor of the event to officially record and/or broadcast the event. The data capture devices may also include any other device that is introduced into the event location that is capable of capturing information about the event. For example, such devices may include mobile telephones carried to the event location by audience members, where the mobile telephones have the capability to record video, audio, and/or still photographs.

Data captured by the data capture devices 110 are generally sent across a data stream 120 to be stored as parameterized data in storage device 140. The data stream 120 may be implemented using any suitable networking framework. For example, a local WiFi network may be established at the event location, which is accessed by mobile data capture devices. Wired network connections may be employed to support fixed data capture devices associated with stage-based recording equipment and fixed video cameras.

The parameterized data comprises the raw data 142 and metadata 143. The raw data 142 corresponds to the underlying media files/data captured by the data capture devices 110. For example, the raw data may be Mpeg4 video files recorded by a mobile device.

The metadata 143 comprises information that establishes coherency of the data relative to other data being recorded for the event. Such data includes, for example, information relating to data and the circumstances surrounding the capture of the data.

One type of metadata 143 that is associated with the raw data 142 is the location of the data capture device 110 that was used to capture the raw data 142. The location of the data capture device may be established using any suitable mechanism. For example, many mobile telephones now incorporate a GPS mechanism that allows calculation of the exact location coordinate for the telephone. For devices that do not incorporate such GPS mechanisms, or if more precise location coordinates are needed, a calibration process at the event location may be utilized to determine the location of the data capture device. For example, "pixel location calibration" may be implemented to identify the exact location of a mobile device, e.g., as described in co-pending U.S. application Ser. No. 13/102,806, entitled "METHOD AND MECHANISM FOR PERFORMING CLOUD IMAGE DISPLAY AND CAPTURE WITH MOBILE DEVICES", filed on even date herewith, which is hereby incorporated by reference in its entirety, and which is now issued as U.S. Pat. No. 8,499,038.

The metadata 143 may also include the orientation of the data capture device 110. Such orientation metadata identifies the specific direction that the data capture device is pointing towards during the period in which the associated raw data 142 was captured.

The metadata 143 also includes synchronized clock data that identifies the time period at which the raw data 142 was captured. It is important to make sure that the various data capture devices 110 are synchronized to the same clock so that the different items of captured data from multiple devices can be properly interrelated with each other. Therefore, the synchronized clock time metadata should be based upon a common clock that is utilized by all data capture devices 110. Any suitable approach can be taken to set the data capture devices to a common clock. One approach is to use the built-in GPS mechanisms within mobile devices, if they exist, to synchronize the clocks within the data capture devices 110. An alternative approach that can be employed is to use a clock calibration process at the event location in which the various data capture devices work with a data controller at a central location to have each mobile device lock to a common clock. An example of this type of approach is described in co-pending U.S. application Ser. No. 13/102,806, entitled "METHOD AND MECHANISM FOR PERFORMING CLOUD IMAGE DISPLAY AND CAPTURE WITH MOBILE DEVICES", filed on even date herewith, which is hereby incorporated by reference in its entirety, and which is now issued as U.S. Pat. No. 8,499,038.

The metadata may also include identification information relating to the live broadcast at certain points in time. For example, at a music concert, the metadata may be used to identify the particular song that is being played during a given time period, and hence the song that corresponds to a given set of data recordings. This type of metadata permits easier classification and later querying of the recorded data as they pertain to certain subjects at the event.

Additional types of meta data include but are not limited to: individual performer or instrument being recorded, play number, period, game time of sporting events, scene in theater, hardware configuration of musical equipment, lighting control configuration, and others.

The metadata 143 is transmitted to a central server at or around the time of its creation. However, it is possible that the raw data 142 is not immediately transmitted to a central server. This is because the bandwidth required to enable every mobile device immediately and in real-time to send the raw data 142 across the network could be too costly in terms of system resources. Instead, in some embodiments, a smaller-footprint summary of the raw data 142 is sent to the central server, with the larger-sized raw data staying at the mobile device until it is requested. The smaller-footprint summary may comprise any type of summary data, so long as it provides sufficient information regarding the contents of its corresponding raw data 142. For example, thumbnail images may be sent to the central server in place of raw high-resolution video or full-resolution photograph images.

A placeholder is maintained at the database of the central server to store the raw data 142. Pointer data is sent to the mobile devices to identify the specific addresses or locations of the placeholders at the central server for the raw data 142.

At the central server, the smaller-footprint summaries are stored with the metadata to allow an organized view of the entirety of the data being captured for the event. Queries may be performed upon this metadata to search for and identify specific items of data that may be of interest for data enhancements.

When there is a desire to access the raw data 142, a check is made at the central server to see if the raw data has already been downloaded from the remote capture devices. If not, then a request is sent to the remote devices to provide the raw data. The pointer data provided to the remote mobile devices permits the raw data to be deposited at the correct placeholder locations at the central server.

It can therefore be seen that storage device 140 may actually comprise a plurality of different devices that act in a coordinated way to store the raw data 142 and the metadata 143. At different points in time, different portions of the raw data 142 and the metadata 143 may be spread across various devices within the system, where some data is stored at a central server and some are stored at remote devices.

Of course, these actions relative to storage of data in storage device 140 will be varied depending upon the type of data that is being handled. For example, it is possible that the remote data capture device is capturing very low resolution images or video, and hence there is no need to send thumbnails in place of the full images. Instead, since the bandwidth requirements are so low to send the raw data for low resolution images or video, it may be more efficient to immediately send the raw data to the central server after it has been captured.

The data storage devices 140 may be implemented as any combination of hardware and software that allows for ready access to the data that is located at the data storage devices 140. For example, the data storage devices 140 could be implemented as computer memory operatively managed by an operating system. The data storage devices 140 could also be implemented as an electronic database system having storage on persistent and/or non-persistent storage.

A data computation module 130 is used to generate enhanced data from the parameterized data. Data computation module 140 accesses the parameterized data to select specific items of data to operate upon. The data may then be enhanced by modifying that data, combining that data with other data, or merely sending that data to another destination.

As previously noted with respect to FIG. 2, data computation may be performed to manipulate the data in any desired manner. For example, it may be desired to combine the video captured from a first device with the audio from another device. The raw data may also be altered in some way, e.g., to account for and correct artifacts in or related to the captured data. The still photographs taken by the various different capture devices could be collected and shown as a mosaic of different views of the event.

Another example of data manipulation is automatic distortion correction. Many devices will capture media in an imperfect way (out of focus, audio clipping, etc). This invention facilitates the use of neighboring devices or pre characterized models of the event environment to enhance the quality of the media using but not limited to such techniques as Bayesian Network-based machine learning pattern matching.

Further details regarding the operations performed by data computation module are described in more detail below in conjunction with FIG. 5.

The enhanced data may take different forms depending upon the circumstances for which the data is being produced. The enhanced data may be generated and used in real-time to be displayed or distributed at the event. For example, the real-time enhanced data 144 may be the type of data that is being broadcast or displayed live at the event location or distributed in real-time to the mobile devices. Resource consumption issues and quality of service (QoS) issues may dictate the manner and form in which the real-time enhanced data 144 is generated. For example, with respect to enhanced video recordings distributed in real-time, bandwidth limitations may result in the enhanced video being produced at lower-quality resolution levels. In contrast, asynchronous/production enhanced data 146 may be produced for non-realtime consumption which do not suffer from such limitations. Therefore, an enhanced video that is in high definition quality may be distributed with much lower quality resolution as real-time enhanced data 144, but retains its high definition quality as asynchronous/production data 146.

The real-time enhanced data 144 may be fed back to the data stream 120 and re-accessed by any of the devices having access to the event data to generate even more enhanced data. Alternatively, the real-time enhanced data 144 and the asynchronous/production enhanced data 146 may be sent to data output devices 140. The data output devices 140 comprise any device that is capable of receiving the enhanced data. For example, the data output device 140 may comprise a display device, such as a large screen at the event location. The data output device may even be the same mobile device (such as a mobile phone) that was used to capture the raw data in the first place.

The system or its components may be controlled or accessed by one or more users at one or more user stations 106 that operate the system. The user station 106 and/or any of the components controlled by the user station 106, such as the data computation module 130, comprises any type of computing station that may be used to operate or interface with the system. Examples of such user stations 106 include for example, workstations, personal computers, or remote computing terminals. User station 106 comprises a display device and/or audio device, such as a display monitor and speakers, for displaying or playing back recorded data to users at the user station 106. User station 106 also comprises one or more input devices for the user to provide operational control over the activities of system, such as a mouse or keyboard to manipulate a pointing object in a graphical user interface.

FIG. 4 shows a flowchart of a process to operate the system of FIG. 3. At 400, a data capture device is registered with the system. For example, at each event location, the local WiFi server would broadcast a signal indicating the availability of participating at the event. When the user of a WiFi-enabled mobile device searches for any nearby WiFi networks that are associated with an event, the signal for one or more events may be identified by the mobile device. The user would select at least one of the events to register the mobile device. The central server would establish a connection to the mobile device and set up unique identification protocols so that any data captured by the mobile device can readily be identified and associated with that specific device. The mobile device would also be synchronized to the common clock shared by all devices for the event.

At 402, the mobile device is used as a data capture device to record some item or items of data corresponding to the event. As noted above, examples of such data include video, sound recordings, or still photographs. The captured data is parameterized at 404 to include metadata containing information to establish coherency of the captured data relative to other data being recorded for the event. Such data includes, for example, information relating to data and the circumstances surrounding the capture of the data, such as position metadata and orientation metadata for the mobile device, as well as clock data with regards to the recording time of the captured data.

At 406, the raw data that was captured and the metadata that was generated are streamed and/or stored as appropriate either at a central server or at the mobile device. The captured data is transformed, at 408, to target a specific output format. This is a compilation action that provides enhanced data suitable for a contemplated use case or use platform. At 410, the targeted data can then be played back on a designated output device.

FIG. 5 shows the flow of a process for generating enhanced data according to some embodiments of the invention. At 502, control instructions are received to manipulate the source data to generate the enhanced data. The control instructions include a target definition that identifies the resources or formats for which the enhanced data is to be generated. For example, the request could be directed to generate a video that is to be played back on a mobile device that is compatible with the Mpeg 4 video format. The target definition would specify that designated format as the output format for the enhanced data.

In addition, compilation control parameters may be included as part of the control instructions. For example, the compilation control parameters may identify whether the enhanced data is to be generated for real-time distribution/display, or whether the enhanced data is to be asynchronously produced for consumption by the requester. Therefore, there may be specific quality requirements and limitations as part of the control parameters or target definitions.

During the compilation stage, the data parameters are analyzed at 504 to identify the specific items of data that need to be accessed at 506 to generate the enhanced data. The metadata at the database at the central server is queried to perform the analysis actions of 504. For example, the initial request may seek video that is recorded from a particular camera angle. The metadata is queried to identify any or all data that was captured from the correct camera angle. In addition, the initial request may include target definitions that require a certain quality threshold for the data. The metadata is analyzed to make sure that the data being identified for enhancement matches the required quality levels of the request. Based on the results of this analysis action, the central server may issue a request to one or more remote devices to transmit raw data to the central server.

At 508, the retrieved data is manipulated to generate the enhanced data. Any appropriate data editing or manipulation technique may be used to generate enhanced data from the raw data. These manipulations include but are not limited to, 3D synthetic image generation, 3D special audio processing, machine learning-based pattern matching for automatic media quality improvement, and others. The enhanced data is then distributed to a target device at 510.

Therefore, what has been described is an improved approach for coherently capturing and organizing data for an event. The present approach allows for very efficient querying and utilization of interrelated data to generated enhanced data for an event.

System Architecture Overview

Figure 6:
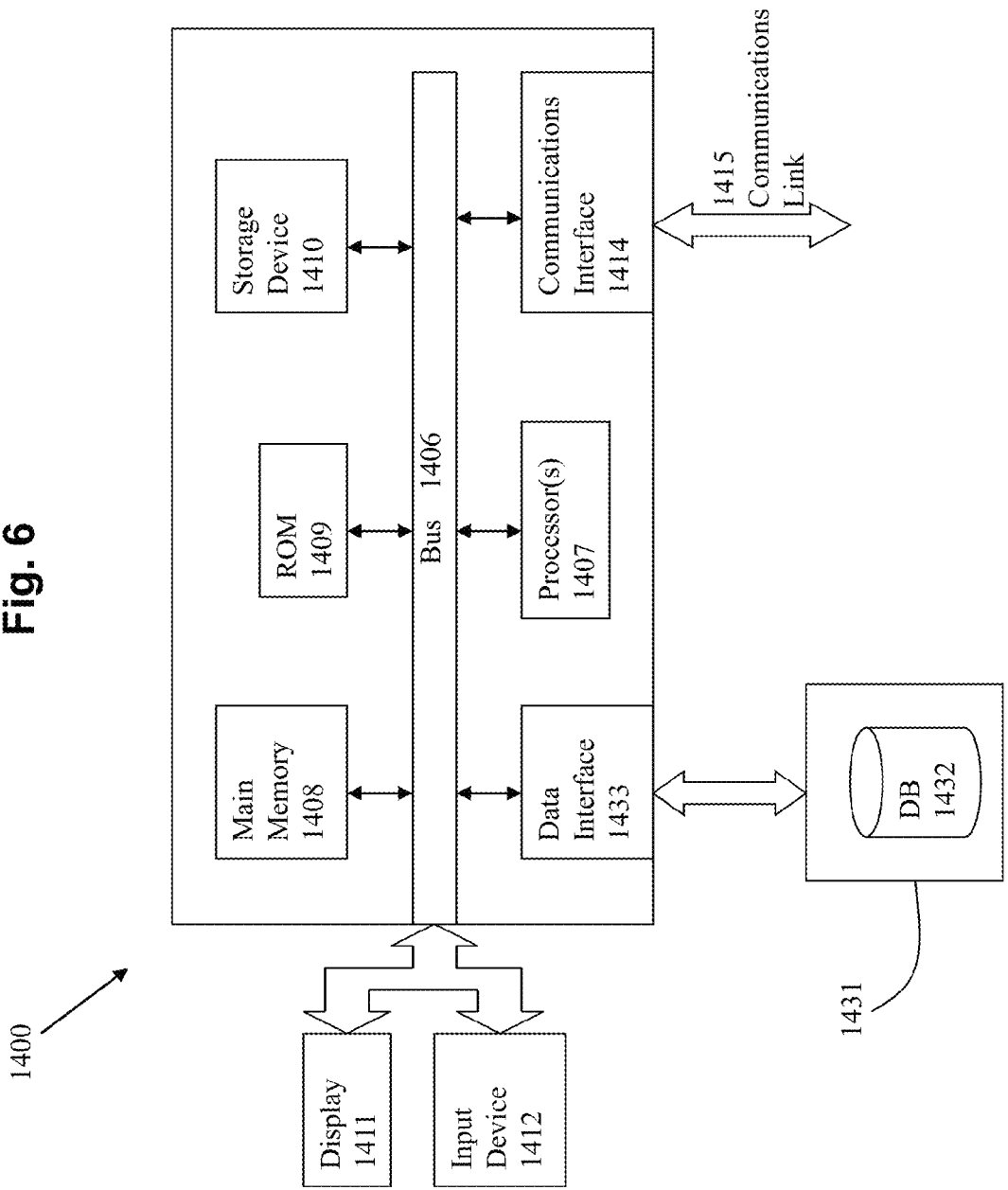
FIG. 6 shows an example computing system with which embodiments of the invention may be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 connected by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for coordinated aggregation of data on a mobile device, comprising:
identifying multimedia data that has been captured with a first mobile device by an audience member at an audience event, wherein the multimedia data is registered with a central server with one or more data parameters;
using the one or more data parameters to perform sharing or aggregation of the multimedia data captured at the first mobile device by the audience member at the audience event to a second mobile device, wherein the one or more data parameters identify a relationship between the multimedia data relative to other data captured at the audience event, the aggregation of the multimedia data comprises image data or video data captured by the first mobile device that is aggregated with audio data from a second capture device, the aggregation is implemented by correlating between the image data or video data from the first mobile device and the audio data from the second capture device using the one or more data parameters, and the sharing comprises sharing of aggregated multimedia data to the second mobile device; and
distributing the multimedia data to the second mobile device.

2. The method of claim 1 in which the multimedia data comprises pictures, videos, or sound from different locations, perspectives, or media capture qualities.

3. The method of claim 1 in which sharing or aggregation of the multimedia data between the first mobile device and the second mobile device is based at least in part upon an event associated with the multimedia data.

4. The method of claim 1 in which sharing or aggregation of the multimedia data between the first mobile device and the second mobile device is based upon at least in part on a location associated with the first mobile device or the second mobile device.

5. The method of claim 4 in which a GPS mechanism at the first mobile device or the second mobile device is employed to determine the location.

6. The method of claim 1 in which proximity relative to a location is employed to implement sharing of the multimedia data between the first mobile device and the second mobile device.

7. The method of claim 1 in which the multimedia data undergoes data manipulation.

8. A computer program product embodied on a non-transitory computer usable medium, the computer readable medium having stored thereon a sequence of instructions which, when executed by a processor causes the processor to execute a method for coordinated aggregation of data on a mobile device, the method comprising:
identifying multimedia data that has been captured with a first mobile device by an audience member at an audience event, wherein the multimedia data is registered with a central server with one or more data parameters;
using the one or more data parameters to perform sharing or aggregation of the multimedia data captured at the first mobile device by the audience member at the audience event to a second mobile device, wherein the one or more data parameters identify a relationship between the multimedia data relative to other data captured at the audience event, the aggregation of the multimedia data comprises image data or video data captured by the first mobile device that is aggregated with audio data from a second capture device, the aggregation is implemented by correlating between the image data or video data from the first mobile device and the audio data from the second capture device using the one or more data parameters, and the sharing comprises sharing of aggregated multimedia data to the second mobile device; and
distributing the multimedia data to the second mobile device.

9. The computer program product of claim 8 in which the multimedia data comprises pictures, videos, or sound from different locations, perspectives, or media capture qualities.

10. The computer program product of claim 8 in which sharing or aggregation of the multimedia data between the first mobile device and the second mobile device is based at least in part upon an event associated with the multimedia data.

11. The computer program product of claim 8 in which sharing or aggregation of the multimedia data between the first mobile device and the second mobile device is based upon at least in part on a location associated with the first mobile device or the second mobile device.

12. The computer program product of claim 11 in which a GPS mechanism at the first mobile device or the second mobile device is employed to determine the location.

13. The computer program product of claim 8 in which proximity relative to a location is employed to implement sharing of the multimedia data between the first mobile device and the second mobile device.

14. The computer program product of claim 8 in which the multimedia data undergoes data manipulation.

15. A system for coordinated aggregation of data on a mobile device, comprising:
- a processor;
- a memory for holding programmable code; and
- wherein the programmable code includes instructions for identifying multimedia data that has been captured with a first mobile device by an audience member at an audience event, wherein the multimedia data is registered with a central server with one or more data parameters; using the one or more data parameters to perform sharing or aggregation of the multimedia data captured at the first mobile device by the audience member at the audience event to a second mobile device, wherein the one or more data parameters identify a relationship between the multimedia data relative to other data captured at the audience event, the aggregation of the multimedia data comprises image data or video data captured by the first mobile device that is aggregated with audio data from a second capture device, the aggregation is implemented by correlating between the image data or video data from the first mobile device and the audio data from the second capture device using the one or more data parameters, and the sharing comprises sharing of aggregated multimedia data to the second mobile device; and distributing the multimedia data to the second mobile device.

16. The system of claim 15 in which the multimedia data comprises pictures, videos, or sound from different locations, perspectives, or media capture qualities.

17. The system of claim 15 in which sharing or aggregation of the multimedia data between the first mobile device and the second mobile device is based at least in part upon an event associated with the multimedia data.

18. The system of claim 15 in which sharing or aggregation of the multimedia data between the first mobile device and the second mobile device is based upon at least in part on a location associated with the first mobile device or the second mobile device.

19. The system of claim 18 in which a GPS mechanism at the first mobile device or the second mobile device is employed to determine the location.

20. The system of claim 15 in which proximity relative to a location is employed to implement sharing of the multimedia data between the first mobile device and the second mobile device.

21. The system of claim 15 in which the multimedia data undergoes data manipulation.

* * * * *